(12) United States Patent
Lanham et al.

(10) Patent No.: US 8,590,398 B2
(45) Date of Patent: Nov. 26, 2013

(54) DUAL TUBE CORIOLIS FLOW METER WITH A CENTRAL STATIONARY PLATE SERVING AS SUPPORT FOR DRIVER AND PICK-OFF COMPONENTS

(75) Inventors: Gregory Treat Lanham, Longmont, CO (US); Christopher A Werbach, Longmont, CO (US)

(73) Assignee: Micro Motion, Inc., Boulder, CO (US)

( * ) Notice: Subject to any disclaimer, the term of this patent is extended or adjusted under 35 U.S.C. 154(b) by 404 days.

(21) Appl. No.: 12/988,843

(22) PCT Filed: May 9, 2008

(86) PCT No.: PCT/US2008/063262
§ 371 (c)(1),
(2), (4) Date: Oct. 21, 2010

(87) PCT Pub. No.: WO2009/136943
PCT Pub. Date: Nov. 12, 2009

(65) Prior Publication Data
US 2011/0041623 A1  Feb. 24, 2011

(51) Int. Cl.
*G01F 1/84* (2006.01)

(52) U.S. Cl.
USPC ..................................... 73/861.355

(58) Field of Classification Search
None
See application file for complete search history.

(56) References Cited

U.S. PATENT DOCUMENTS

| | | | |
|---|---|---|---|
| 4,738,144 A * | 4/1988 | Cage | 73/861.355 |
| 4,756,198 A | 7/1988 | Levien | |
| 4,798,091 A | 1/1989 | Lew | |
| 4,876,898 A * | 10/1989 | Cage et al. | 73/861.355 |
| 5,349,872 A * | 9/1994 | Kalotay et al. | 73/861.355 |
| 5,663,509 A * | 9/1997 | Lew et al. | 73/861.357 |
| 6,138,517 A * | 10/2000 | Laursen et al. | 73/861.355 |
| 6,553,845 B2 * | 4/2003 | Ohnishi et al. | 73/861.355 |
| 6,684,716 B2 * | 2/2004 | Ohnishi et al. | 73/861.357 |
| 6,711,958 B2 | 3/2004 | Bitto et al. | |
| 7,228,749 B2 * | 6/2007 | Kassubek et al. | 73/861.357 |
| 7,437,949 B2 * | 10/2008 | Nakao et al. | 73/861.355 |
| 7,845,242 B2 * | 12/2010 | McAnally et al. | 73/861.355 |
| 7,861,603 B2 * | 1/2011 | Takayanagi | 73/861.355 |
| 2002/0020228 A1 * | 2/2002 | Ohnishi et al. | 73/861.357 |
| 2007/0034019 A1 * | 2/2007 | Doihara et al. | 73/861.355 |
| 2007/0095151 A1 * | 5/2007 | Kitami | 73/861.355 |
| 2010/0005906 A1 * | 1/2010 | Shimizu et al. | 73/861.357 |
| 2011/0000315 A1 * | 1/2011 | Tsubota et al. | 73/861.357 |

FOREIGN PATENT DOCUMENTS

| | | |
|---|---|---|
| CN | 1159223 A | 9/1997 |
| EP | 1319930 | 6/2003 |
| EP | 1693653 A1 | 8/2006 |
| JP | 63233328 | 9/1988 |
| JP | 04236328 | 8/1992 |
| JP | 09126851 | 5/1997 |
| JP | 2005164374 | 6/2005 |
| RU | 2233432 C2 | 7/2004 |
| WO | 0012970 A1 | 3/2000 |

* cited by examiner

*Primary Examiner* — Harshad R Patel
(74) *Attorney, Agent, or Firm* — The Ollila Law Group

(57) ABSTRACT

A flow meter (30) is provided that includes first and second flow tubes (103, 103'). The flow meter (30) also includes a stationary plate (250). At least a portion of the stationary plate (250) is positioned between the first and second flow tubes (103, 103'). At least one of a driver component or a pick-off components is coupled to the stationary plate (250).

17 Claims, 4 Drawing Sheets

DUAL TUBE CORIOLIS FLOW METER WITH A CENTRAL STATIONARY PLATE SERVING AS SUPPORT FOR DRIVER AND PICK-OFF COMPONENTS

TECHNICAL FIELD

The present invention relates to a flow meter, and more particularly, to a Coriolis flow meter with driver or pick-off components coupled to a stationary element.

BACKGROUND OF THE INVENTION

It is generally known to use Coriolis effect mass flow meters to measure mass flow and other information for materials flowing through a conduit in the flow meter. Exemplary Coriolis flow meters are disclosed in U.S. Pat. No. 4,109,524, U.S. Pat. No. 4,491,025, and Re. 31,450 all to J. E. Smith et al. These flow meters have one or more conduits of straight or curved configuration. Each conduit configuration in a Coriolis mass flow meter has a set of natural vibration modes, which may be of simple bending, torsional, or coupled type. Each conduit can be driven to oscillate at resonance in one of these natural modes. Material flows into the flow meter from a connected pipeline on the inlet side of the flow meter, is directed through the conduit or conduits, and exits the flow meter through the outlet side of the flow meter. The natural vibration modes of the vibrating, material filled system are defined in part by the combined mass of the conduits and the material flowing within the conduits.

When there is no flow through the flow meter, all points along the conduit oscillate due to an applied driver force. The points can oscillate with identical phase or a small initial fixed phase offset, which can be corrected. As material begins to flow through the flow meter, Coriolis forces cause each point along the conduit to have a different phase. For example, the phase at the inlet end of the flow meter lags the driver, while the phase at the outlet leads the driver. Pick-off sensors on the conduit(s) produce sinusoidal signals representative of the motion of the conduit(s). Signals output from the pick-off sensors are processed to determine the phase difference between the pick-off sensors. The phase difference between the two or more pick-off sensors is proportional to the mass flow rate of material through the conduit(s).

Although there are many pick-off arrangements, one particularly popular driver and pick-off arrangement comprises a magnet-coil assembly. Typically in a dual flow tube arrangement, a magnet is affixed to one flow tube and a coil is affixed to the other flow tube and positioned proximate the magnet. In this arrangement, the driving coil is supplied with an alternating current which induces the flow tubes to vibrate. The pick-off sensor magnet-coil assembly then produces an induced voltage which is proportional to the motion of the flow tubes. Typically, there is one pick-off sensor at an inlet end of the flow tubes and another pick-off sensor positioned at the outlet end. Therefore, each flow tube includes at least a driver component and two pick-off components. The operation of the magnet-coil assembly is generally known in the art.

One problem with the above arrangement is connecting the wires to the coils on the moving flow tubes. In the past, this has been dealt with in a number of ways. The first way is to attach the wires to the flow tubes using some sort of tape or adhesive. Another approach, particularly in smaller tube diameter flow meters, is to use thin flexible conductors (flexures). Both of these approaches have drawbacks. The use of tape or adhesives provides an unsatisfactory solution because the tape or adhesive is generally a high damping material, with the damping changing unpredictably with both time and temperature. These changes can result in erroneous flow signals and errors in the meter's performance. While the flexures have little damping, they typically have very distinct natural frequencies and exciting them at a natural frequency can result in rapid failure. In addition, they are extremely fragile due to their size.

A number of patents have disclosed proposed solutions to the problems outlined above. For example, U.S. Pat. No. 4,756,198 discloses welding a coil mount to the flow meter housing. The coils are then mounted to the coil mount with only the magnets being attached to the flow tubes. A problem with the '198 patent's solution is that the wires hang freely from the coils. Thus, while this proposed solution provides an improvement over attaching the coils to the flow tube, the same problems are encountered with loose wires.

Another proposed solution is disclosed in U.S. Pat. No. 5,349,872. The '872 patent discloses removing the coils from the flow tubes and mounting them on two printed circuit boards (PCB), one positioned above the flow tubes and another positioned below the flow tubes. While this solution solves the loose wire situation of the '198 patent, it incorporates an excess of components and creates the possibility of errors caused by inconsistent gaps.

Therefore, there is a need to provide a flow meter that does not require the coils to be attached to the flow tubes and at the same time uses a minimum number of components. The present invention overcomes these and other problems and an advance in the art is achieved.

ASPECTS

According to an aspect of the invention, a flow meter (30) including first and second flow tubes (103, 103'), comprises:
  a stationary plate (250), with at least a portion of the stationary plate (250) positioned between the first and second flow tubes (103, 103'); and
  at least one of a driver component or a pick-off component coupled to the stationary plate (250).

Preferably, the entire stationary plate (250) is positioned between the first and second flow tubes (103, 103').

Preferably, the driver component comprises a drive coil (104B) and the flow meter (30) further comprises a drive magnet (104A) coupled to one of the first or second flow tubes (103, 103') proximate the drive coil (104B).

Preferably, the driver component comprises a first drive coil (104B) coupled to a first side of stationary plate (250) and further comprising a second drive coil (104B) coupled to a second side of the stationary plate (250).

Preferably, the flow meter (30) further comprises a first drive magnet (104A) coupled to the first flow tube (103) proximate the first drive coil (104B) and a second drive magnet (104A) coupled to the second flow tube (103') proximate the second drive coil (104B).

Preferably, the pick-off component comprises a pick-off coil (105B, 106B) coupled to the stationary plate (250) and the flow meter (30) further comprises a pick-off magnet (105A, 106A) coupled to one of the first or second flow tubes (103, 103') proximate the pick-off coil (105B, 106B).

Preferably, the pick-off component comprises a first pick-off coil (105B) coupled to the stationary plate (250) and further comprising a second pick-off coil (106B) coupled to the stationary plate (250).

Preferably, the flow meter (30) further comprises a first pick-off magnet (105A) coupled to the first flow tube (103) proximate the first pick-off coil (105B) and a second pick-off magnet (106A) coupled to the second flow tube (103') proximate the second pick-off coil (106B).

Preferably, the flow meter (30) further comprises one or more counter balances 415 coupled to first and second flow tubes 103, 103'.

Preferably, the flow meter (30) further comprises a second stationary plate (250), wherein one of the first pick-off coil (105B) or the second pick-off coil (106B) is coupled to the second stationary plate (250), while the other of the second pick-off coil (106B) or the first pick-off coil (105B) is coupled to the first stationary plate (250).

Preferably, the stationary plate (250) is connected to meter electronics (20).

Preferably, the first and second flow tubes (103, 103') are adapted to vibrate with respect to the stationary plate (250).

According to another aspect of the invention, a flow meter (30) including first and second flow tubes (103, 103'), comprises:
- a stationary plate (250), with at least a portion of the stationary plate (250) positioned between the first and second flow tubes (103, 103'), wherein the first and second flow tubes (103, 103') are adapted to vibrate with respect to the stationary plate (250);
- a first pick-off sensor (105) including a first pick-off coil (105B) coupled to the stationary plate (250) and a first pick-off magnet (105A) coupled to the first flow tube (103) proximate the first pick-off coil (105B);
- a second pick-off sensor (106) including a second pick-off coil (106B) coupled to the stationary plate (250) and a second pick-off magnet (106A) coupled to the second flow tube (103') proximate the second pick-off coil (106B); and
- a driver (104) including a first drive coil (104B) coupled to the stationary plate (250) and a first drive magnet (104A) coupled to one of the first or second flow tubes (103, 103') proximate the first drive coil (104B).

Preferably, the entire stationary plate (250) is positioned between the first and second flow tubes (103, 103').

Preferably, the first drive coil (104B) is coupled to a first side of the stationary plate (250) and the first drive magnet (104A) is coupled to the first flow tube (103), the driver (104) further comprising a second drive coil (104B) coupled to a second side of the stationary plate (250) and a second drive magnet (104A) coupled to the second flow tube (103') proximate the second drive coil (104B).

Preferably, the flow meter (30) further comprises one or more counter balances 415 coupled to the first and second flow tubes (103, 103').

Preferably, the stationary plate (250) is connected to meter electronics (20).

DETAILED DESCRIPTION OF THE INVENTION

FIGS. 1-4 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
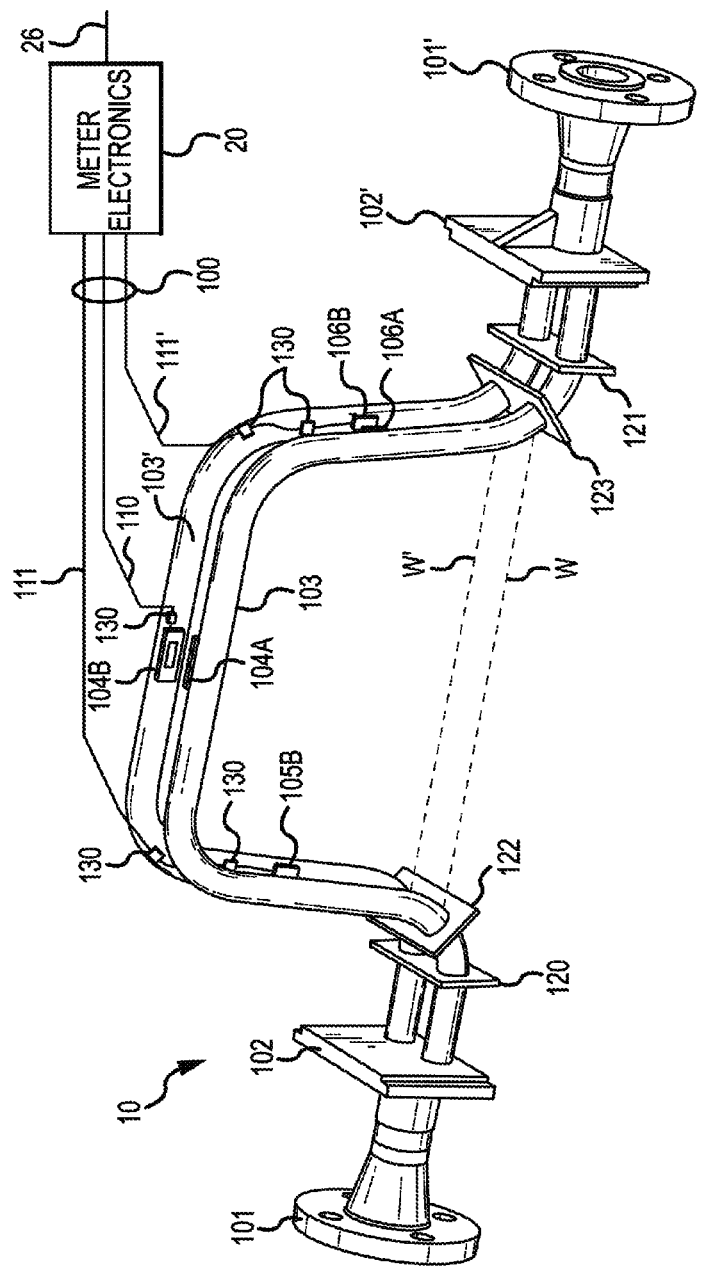
FIG. 1 shows a flow meter according to the prior art.

FIG. 1 shows a Coriolis flow meter 10 according to the prior art. The Coriolis flow meter 10 comprises an inlet flange 101 and an outlet flange 101'. Coriolis flow meter 10 is adapted to be connected to a fluid pipeline or the like via inlet and outlet flanges 101, 101'. As fluid enters inlet flange 101, it is diverted into two separate streams by manifold 102. The fluid is separated and enters one of the flow tubes 103 or 103'. As the process fluid exits the flow tubes 103, 103', manifold 102' recombines the process fluid before it exits through the outlet manifold 101'. Coriolis flow meter 10 also includes a driver 104, which comprises a magnet 104A and a coil assembly 104B. Similarly, the Coriolis flow meter 10 includes a first pick-off sensor 105 and a second pick-off sensor 106, which comprise a magnet 105A (not shown), 106A, and a coil assembly 105B, 106B.

In operation, a drive signal is sent to the drive coil 104B via lead 110 by meter electronics 20. The drive signal causes the flow tubes 103, 103' to vibrate about bending axes W, W', respectively. The axes W, W' are partially defined using a plurality of brace bars 120-123, which limit the active area of the flow meter 10. The vibrating flow tubes 103, 103' induce voltages in the pick-off sensors 105, 106, which are sent to meter electronics 20 via leads 111 and 111'. Meter electronics 20 produces mass flow information, along with other information such as material density based on the signals sent by the pick-off sensors 105, 106. Temperature measurement devices such as RTDs (not shown) can also provide temperature measurements. Meter electronics 20 can send this information to a downstream process via lead 26.

As can be seen in FIG. 1, the leads 110, 111, and 111', which connect the coil assemblies 104B, 105B, and 106B to meter electronics 20, are connected to the flow tube 103' using an adhesive 130. The adhesive 130 may adversely affect the Coriolis flow meter's performance by introducing additional damping causing sensor instability. Additionally, if the flow meter 10 is exposed to fluctuating temperatures, the adhesive may begin to peel, requiring additional maintenance.

Figure 2:
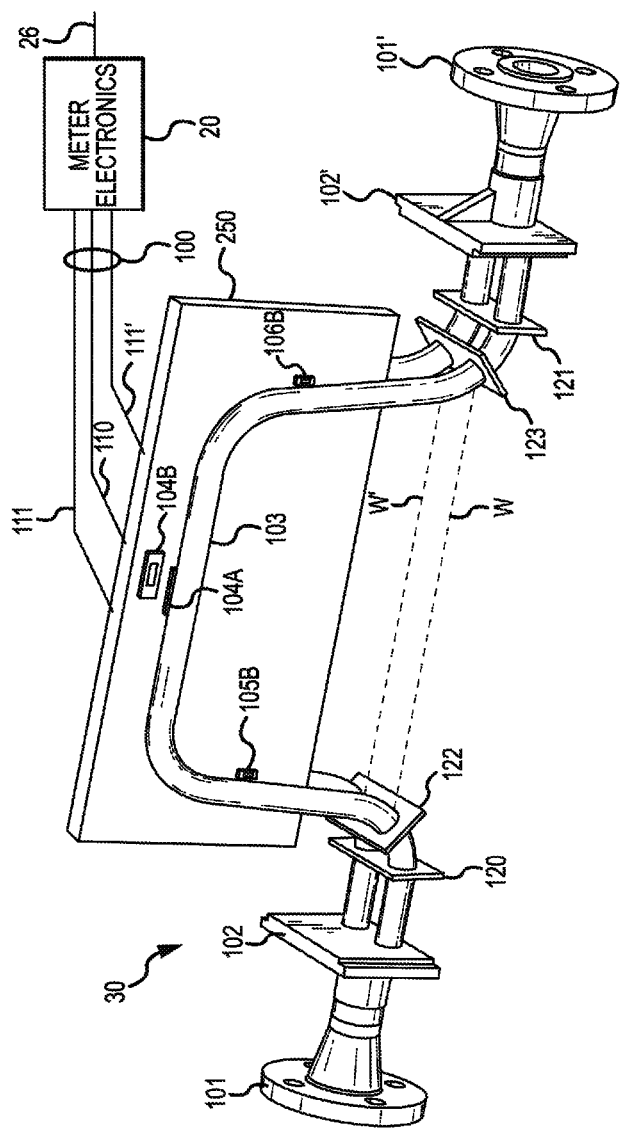
FIG. 2 shows a flow meter according to an embodiment of the invention.

FIG. 2 shows a flow meter 30 according to an embodiment of the invention. According to one embodiment, the flow meter 30 comprises a Coriolis flow meter. However, it should be understood that the flow meter 30 may comprise other types of flow meters, such as a vibrating densitometer. Therefore, the scope of the invention should not be limited to Coriolis flow meters.

The flow meter 30 is similar to the flow meter 10 of the prior art; the difference being the presence of a stationary plate 250. The stationary plate 250 may comprise a number of materials and configurations. According to one embodiment of the invention, the stationary plate 250 comprises a printed circuit board (PCB) 250. However, it should be understood that the stationary plate 250 may comprise other materials or combinations of materials and the present invention should not be limited to the use of a PCB. Although the following description however, refers to the stationary plate 250 as being a PCB for the purpose of simplicity, it should be understood that the invention is not so limited.

According to an embodiment of the invention, at least a portion of the PCB 250 is positioned between the two flow tubes 103, 103'. According to another embodiment, the entire PCB 250 is positioned between the two flow tubes 103, 103'. The PCB 250 may be secured to a structure external to the flow meter 30, or alternatively, in some embodiments, the PCB 250 is secured to the flow meter housing (not shown). According to another embodiment of the invention, the PCB 250 is secured to one or more of the brace bars 120-123. The particular method used for securing the PCB 250 is not important for purposes of the present invention, however in most embodiments, the PCB 250 remains substantially stationary with respect to the flow tubes 103, 103'. It should be understood however, that in some embodiments, minor vibrations of the PCB 250 may be tolerated and compensated for during a calibration routine.

According to the embodiment shown in FIG. 2, a driver component is coupled to the PCB 250. The driver component as described herein comprises either a drive coil, such as drive coil 104B, or a drive magnet, such as drive magnet 104A. It should also be understood that the wires connecting the coil 104B to meter electronics 20 can be coupled to the PCB 250. According to another embodiment of the invention, a pick-off component is coupled to the PCB 250. The pick-off component as described herein comprises either a pick-off coil or a pick-off magnet. It should also be understood that the wires connecting the pick-off sensor to meter electronics 20 can be coupled to the PCB 250. The driver and pick-off components may be coupled to the PCB 250 using known bonding or fastening techniques. According to an embodiment of the invention, the magnets 104A, 105A, and 106A are coupled to the PCB 250. According to another embodiment of the invention, all of the coils 104B, 105B, 106B of the driver 104 and pick-off sensors 105, 106 are coupled to the PCB 250 with the magnets 104A, 105A, and 106A being attached to the flow tubes 103, 103'. Advantageously, the flow tubes 103, 103' of the flow meter 30 are both lighter than the flow tubes 103, 103' of the flow meter 10, but also, the PCB 250 eliminates the need to secure leads 110, 111, and 111' to the flow tubes 103 or 103'. Therefore, the problems outlined above with regard to attaching wires to the flow tubes 103, 103' can be reduced or, in some embodiments, eliminated. According to another embodiment, only the pick-off coils 105B, 106B are coupled to the PCB 250, while the drive coil 104B is connected to the flow tubes 103, 103' according to the prior art method. In this embodiment, the PCB 250 may comprise an aperture for the driver 104 to fit through with the pick-off coils 105B, 106B being integrated into the PCB 250. Alternatively, the PCB 250 may be positioned below the driver 104.

According to an embodiment of the invention, the leads 100 connect the PCB 250 directly to meter electronics 20. According to an embodiment of the invention, each individual lead 100 can be routed through the interior of PCB 250, thus eliminating the exposure of wires. Alternatively, multiple PCBs 250 can be implemented and the individual leads 100 may be routed between the two PCBs. In another alternative, the leads 100 may be bonded or fastened to the exterior of the PCB 250.

Although the embodiment of FIG. 2 shows a single PCB 250, it should be understood that according to some embodiments, more than one PCB 250 is positioned between the flow tubes 103, 103'. According to one embodiment, each coil 104B, 105B, and 106B is mounted on a separate PCB. Therefore, the present invention should not be limited to a single PCB 250.

By positioning the PCB 250 between the flow tubes 103, 103', the need to secure the leads 100 that connect the driver 104 and pick-off sensors 105, 106 to meter electronics 20 can be reduced. In embodiments where all of the coils 104B, 105B, and 106B are coupled to the PCB 250, the need to secure the leads 100 to the flow tubes 103, 103' can be eliminated. Advantageously, the leads 100 do not affect the damping or the natural frequency of the flow tubes 103, 103'. Thus, the flow meter 30 provides a more stable and efficient vibrating flow meter than the prior art. Furthermore, the flow meter 30 does not include the additional weight of the tape and wire, which can cause the sensor to be out of balance, affecting sensor performance. In addition, the use of the PCB 250 in the flow meter 30 eliminates the above mentioned problems associated with the use of flexures.

Figure 3:
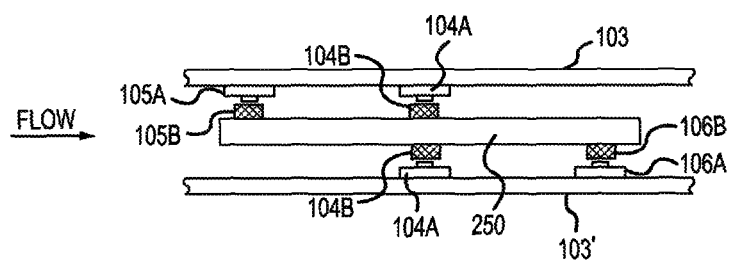
FIG. 3 shows a portion of the flow meter along with a stationary element according to an embodiment of the invention.

FIG. 3 shows the flow meter 30 from a top view according to an embodiment of the invention. FIG. 3 does not show the entire flow meter 30, but rather shows a portion of the flow tubes 103, 103' along with the PCB 250. As can be seen, according to an embodiment of the invention, at least a portion of the PCB 250 is positioned between the flow tubes 103, 103'. According to another embodiment of the invention, the entire PCB 250 is positioned between the flow tubes 103, 103'.

The embodiment shown in FIG. 3 differs from the embodiment shown in FIG. 2 in one important aspect; the embodiment shown in FIG. 3 only includes one magnet 105A at the inlet end of the driver 104 and only one magnet 106A at the outlet end of the driver 104. Therefore, the first pick-off sensor 105 is coupled to only one flow tube 103 or 103'. Similarly, the second pick-off sensor 106 is coupled to only one flow tube 103', 103. Therefore, the flow tube 103' has a first pick-off sensor 105 and the flow tube 103 has a second pick-off sensor 106. According to one embodiment of the invention, the flow meter 30 measures a phase difference between the inlet end of flow tube 103' to that of the outlet of flow tube 103.

While the embodiment shown in FIG. 3 shows the first pick-off magnet 105A being positioned on flow tube 103' and the second pick-off magnet 106A being positioned on flow tube 103, it should be understood that in other embodiments, the magnets 105A, 106A can be switched. The precise positioning is not important for purposes of the present invention. However, according to an embodiment of the invention, the first pick-off magnet 105A and the second pick-off magnet 106A are positioned on different flow tubes 103, 103'.

Figure 4:
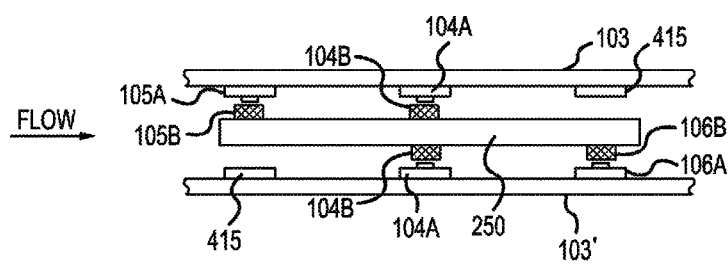
FIG. 4 shows a portion of the flow meter along with the stationary element according to another embodiment of the invention.

FIG. 4 shows a top view of the flow meter 30 a portion of the flow meter 30 according to an embodiment of the invention. The embodiment shown in FIG. 4 is similar to the embodiment shown in FIG. 3, with the exception of the counter balances 415. As described above, according to an embodiment of the invention, the flow meter 30 only includes one pick-off 105 at the inlet end of the driver 104 and only one pick-off 106 at the outlet end of the driver 104. Because only a single pick-off magnet is included on each flow tube 103, 103', the flow tubes 103, 103' may be unbalanced.

According to an embodiment of the invention, the counter balances 415 are provided to compensate for the unbalanced flow tube 103, 103'. According to one embodiment, the counter balances 415 are positioned on the flow tube 103, 103', in substantially the same location as a magnet would be placed according to the prior art. According to another embodiment of the invention, the counter balances 415 are placed in a position different from where the magnet would be positioned according to the prior art. In some embodiments, the counter balances 415 may be positioned on the outside portion of the flow tubes 103, 103', rather than the inside as shown in FIG. 4. In yet other embodiments, the counter balances 415 may be positioned substantially around the entire outer diameter of the flow tubes 103, 103', for example, as sleeves. According to an embodiment of the invention, the counter balances 415 are substantially the same weight as the magnets 105A, 106A. However, the weight of the counter balances 415 may have a weight different from the magnets 105A, 106A.

The counter balances 415 are provided to balance the flow tubes 103, 103' by countering the weight added to the flow tubes 103, 103' by the magnets 105A, and 106A. Thus, even though the flow tubes 103, 103' only include one pick-off magnet 105A, 106A, the flow tubes 103, 103' will still be balanced.

The present invention provides a flow meter 30 that does not require leads 100 to be attached to the outside of the flow tubes 103, 103'. Furthermore, the present invention provides a flow meter 30 that only includes a single pick-off attached to the each of the flow tubes 103, 103'. It should be appreciated that the inventive concepts disclosed above are not only applicable to Coriolis flow meters, but are also applicable to other flow meters that require the use of wires that extend from pick-off sensors.

The detailed descriptions of the above embodiments are not exhaustive descriptions of all embodiments contemplated by the inventors to be within the scope of the invention. Indeed, persons skilled in the art will recognize that certain elements of the above-described embodiments may variously be combined or eliminated to create further embodiments, and such further embodiments fall within the scope and teachings of the invention. It will also be apparent to those of ordinary skill in the art that the above-described embodiments may be combined in whole or in part to create additional embodiments within the scope and teachings of the invention.

Thus, although specific embodiments of, and examples for, the invention are described herein for illustrative purposes, various equivalent modifications are possible within the scope of the invention, as those skilled in the relevant art will recognize. The teachings provided herein can be applied to other flow meters, and not just to the embodiments described above and shown in the accompanying figures. Accordingly, the scope of the invention should be determined from the following claims.

We claim:

1. A flow meter (30) including first and second flow tubes (103, 103'), comprising:
    a stationary plate (250), with at least a portion of the stationary plate (250) positioned between the first and second flow tubes (103, 103');
    at least one of a driver component or a pick-off component coupled to the stationary plate (250); and
    leads (100) coupled to the stationary plate (250) and in electronic communication with the at least one of the driver component or the pick-off component.

2. The flow meter (30) of claim 1, wherein the entire stationary plate (250) is positioned between the first and second flow tubes (103, 103').

3. The flow meter (30) of claim 1, wherein the driver component comprises a drive coil (104B) and the flow meter (30) further comprises a drive magnet (104A) coupled to one of the first or second flow tubes (103, 103') proximate the drive coil (104B).

4. The flow meter (30) of claim 1, wherein the driver component comprises a first drive coil (104B) coupled to a first side of stationary plate (250) and further comprising a second drive coil (104B) coupled to a second side of the stationary plate (250).

5. The flow meter (30) of claim 4, further comprising a first drive magnet (104A) coupled to the first flow tube (103) proximate the first drive coil (104B) and a second drive magnet (104A) coupled to the second flow tube (103') proximate the second drive coil (104B).

6. The flow meter (30) of claim 1, wherein the pick-off component comprises a pick-off coil (105B, 106B) coupled to the stationary plate (250) and the flow meter (30) further comprises a pick-off magnet (105A, 106A) coupled to one of the first or second flow tubes (103, 103') proximate the pick-off coil (105B, 106B).

7. The flow meter (30) of claim 1, wherein the pick-off component comprises a first pick-off coil (105B) coupled to the stationary plate (250) and further comprising a second pick-off coil (106B) coupled to the stationary plate (250).

8. The flow meter (30) of claim 7, further comprising a first pick-off magnet (105A) coupled to the first flow tube (103) proximate the first pick-off coil (105B) and a second pick-off magnet (106A) coupled to the second flow tube (103') proximate the second pick-off coil (106B).

9. The flow meter (30) of claim 7, further comprising one or more counter balances 415 coupled to first and second flow tubes 103, 103'.

10. The flow meter (30) of claim 7, further comprising a second stationary plate (250), wherein one of the first pick-off coil (105B) or the second pick-off coil (106B) is coupled to the second stationary plate (250), while the other of the second pick-off coil (106B) or the first pick-off coil (105B) is coupled to the first stationary plate (250).

11. The flow meter (30) of claim 1, wherein the stationary plate (250) is connected to meter electronics (20).

12. The flow meter (30) of claim 1, wherein the first and second flow tubes (103, 103') are adapted to vibrate with respect to the stationary plate (250).

13. A flow meter (30) including first and second flow tubes (103, 103'), comprising:
    a stationary plate (250), with at least a portion of the stationary plate (250) positioned between the first and second flow tubes (103, 103'), wherein the first and second flow tubes (103, 103') are adapted to vibrate with respect to the stationary plate (250);
    a first pick-off sensor (105) including a first pick-off coil (105B) coupled to the stationary plate (250) and a first pick-off magnet (105A) coupled to the first flow tube (103) proximate the first pick-off coil (105B);
    a second pick-off sensor (106) including a second pick-off coil (106B) coupled to the stationary plate (250) and a second pick-off magnet (106A) coupled to the second flow tube (103') proximate the second pick-off coil (106B); and
    a driver (104) including a first drive coil (104B) coupled to the stationary plate (250) and a first drive magnet (104A) coupled to one of the first or second flow tubes (103, 103') proximate the first drive coil (104B);
    and leads (100) coupled to the stationary plate (250) and in electronic communication with the first pick-off sensor (105), the second pick-off sensor (106), and the driver (104).

14. The flow meter (30) of claim 13, wherein the entire stationary plate (250) is positioned between the first and second flow tubes (103, 103').

15. The flow meter (30) of claim 13, wherein the first drive coil (104B) is coupled to a first side of the stationary plate (250) and the first drive magnet (104A) is coupled to the first flow tube (103), the driver (104) further comprising a second drive coil (104B) coupled to a second side of the stationary plate (250) and a second drive magnet (104A) coupled to the second flow tube (103') proximate the second drive coil (104B).

16. The flow meter (30) of claim 13, further comprising one or more counter balances 415 coupled to the first and second flow tubes (103, 103').

17. The flow meter (30) of claim 13, wherein the stationary plate (250) is connected to meter electronics (20).

\* \* \* \* \*